United States Patent [19]
Phillips

[11] 3,765,280
[45] Oct. 16, 1973

[54] TRIANGLE BIT HOLDER BLOCK
[76] Inventor: Brenis Phillips, Rt. 2, Box 208, French Creek, W. Va.
[22] Filed: Oct. 13, 1971
[21] Appl. No.: 188,821

[52] U.S. Cl. .................................. 82/36, 29/97
[51] Int. Cl. ..................... B23b 29/00, B26d 1/00
[58] Field of Search ..................... 82/35, 36, 36 A, 82/36 B, 37; 29/97, 96

[56] References Cited
UNITED STATES PATENTS
| 946,924 | 1/1910 | Thompson | 82/36 A |
| 2,502,274 | 3/1950 | Pearce et al | 82/36 R |
| 2,324,316 | 7/1943 | Milutin | 82/35 R |
| 3,182,534 | 5/1965 | Hoffmann | 82/35 R |
| 206,485 | 7/1878 | Riess | 82/35 R |
| 2,672,676 | 3/1954 | Anderson | 82/36 A |
| 3,088,351 | 5/1963 | Schardt | 82/36 R |
| 997,121 | 7/1911 | Emley | 82/36 R |

FOREIGN PATENTS OR APPLICATIONS
| 575,247 | 2/1946 | Great Britain | 82/37 |
| 332,911 | 11/1958 | Switzerland | 82/36 |

Primary Examiner—Harrison L. Hinson

[57] ABSTRACT

A cutting tool holder which consists of a block and which is recessed to hold six bits of which three may be retained at any one time, the block being held on a lathe carriage by a bolt.

4 Claims, 5 Drawing Figures

PATENTED OCT 16 1973 3,765,280
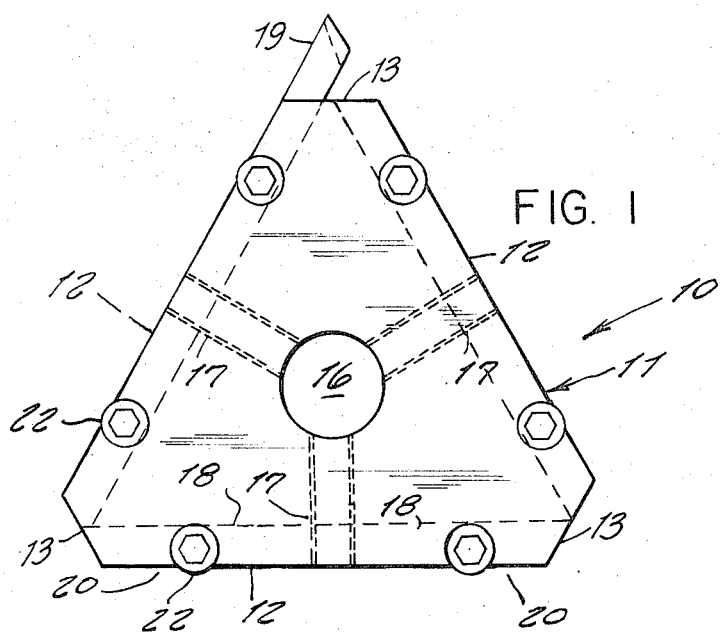
FIG. 1
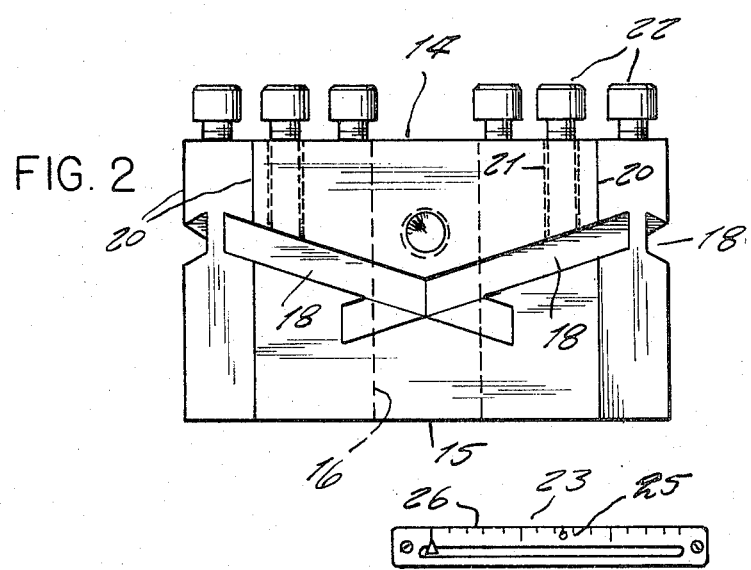
FIG. 2
FIG. 4
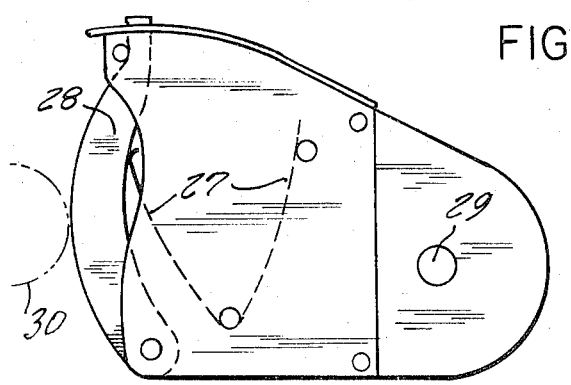
FIG. 3
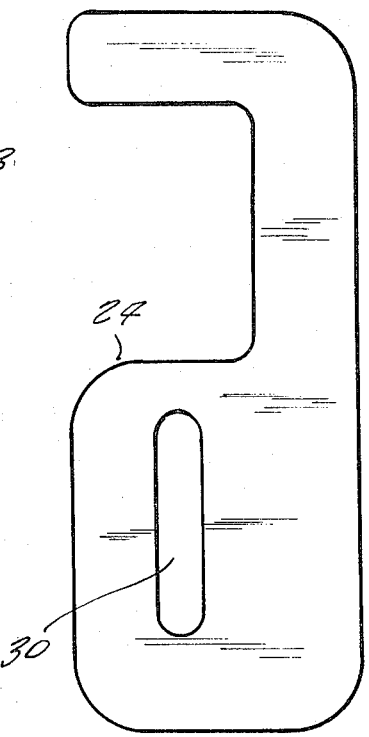
FIG. 5
INVENTOR.
BRENIS PHILLIPS

TRIANGLE BIT HOLDER BLOCK

This invention relates generally to cutting tool holders.

A principal object of the present invention is to provide a triangle bit holder block and which is recessed so as to hold six bits.

Another object of the present invention is to provide a triangle bit holder block wherein three of the six bits may be held at any one time.

Still another object of the present invention is to provide a triangle bit holder block which is held on a lathe carriage by a bolt through a center of the block.

Still another object of the present invention is to provide a triangle bit holder block which can be rotated to any triangle.

Still another object of the present invention is to provide a triangle bit holder block which is associated with an auxilliary guage used to aid in material being centered in a lathe chuck.

Still another object of the present invention is to provide a triangle bit holder block which is associated with an accessory stabilizing hook which is bolted thereto and which aids in steadying a material that is being turned on a lathe.

Other objects of the present invention are to provide a triangle bit holder block which is simple in design, inexpensive to manufacture, rugged in construction, easy to use and efficient in operation.

These and other objects will be readily evident upon a study of the following specification and the accompanying drawing wherein:

FIG. 1 is a plan view of the present invention, and showing the cutting bit in phantom lines, FIG. 2 is a side elevation view thereof, FIG. 3 is a side elevation view of a guage attachable to the bit holder, FIG. 4 is a plan view of the indicator guage illustrated in FIG. 3, and FIG. 5 is a view of a stabilizing hook attachable to the bit holder.

Referring now to the drawing in detail, the reference numeral 10 represents a triangle bit holder block according to the present invention wherein there is a block member 11 which is of benerally triangular configuration and which accordingly incorporates three sides 12 which are located at 60° respective to each other, the corners between the sides 12 being flattened to form intermediate side walls 13.

The block 11 has parallel top and bottom walls 14 and 15 respectively. A vertically central opening 16 through the triangle bit holder block is adaptable to receive a mounting bolt for retaining the block on a lathe carriage At the center of each side wall 12 there is a tapped blind opening 17, and each of the side walls 12 includes a pair of crossing recesses 18 for holding cutting bits 19, the crossing recesses each having one end thereof opening out on a corner edge 20 and into the side walls 13.

A vertically extending threaded opening 21 receives a locking set screw 22, each set screw being positioned so to bear against a upper side of one of the cutting bits retained within the recess 18.

The blind tapped opening 17 is utilized for securement of either a guage 23 or a stabilizing hook 24 thereto.

The guage 23 comprises an indicator guage used to aid in material being centered in the lathe chuck, When use, the same is bolted to a side of the bit block. The guage 23 includes a scale 25 along a linear edge 26.

The stabilizing hook 24 bolted to the side of the bit block serves to aid in steadying a material being turned on the lathe.

Referring now to FIG. 3 of the drawing, there is shown a spring 27 recessed in the centering arm 28 and the reference numeral 29 shows where they are drilled to be fastened to the bit block in alignment with the threaded opening 17.

The reference numeral 30 indicates material in a lathe.

In FIG. 5, the opening 31 indicates a slotted opening for being aligned with the threaded opening 17 of the bit block for securement thereto.

It is to be noted that the tool holder is recessed to hold the rear end of the bit snug in the tool holder, as same as the front end of the bit. The bit has to be embedded in the block in order to attach the center guage and stabilizer hook to the block.

In operative use, all that is necessary is to line up the thread cutting bit which is accomplished by putting the side that the threading bit is in perpendicular with the material that is being threaded. Thus there is provided a triangle bit holder block of novel type.

What I now claim is:

1. An indexable cutting tool and holder combination for holding multiple tool bits and accessory tools consisting of; a holder block member of a generally equilateral triangular cross sectional configuration with truncated apexes, said block being defined by upper and lower planar parallel wall surfaces bounded by three equal relatively long side surface with tool recesses therein and three equal relatively short side surfaces provided by the said truncated apexes and defining intermediate side walls between said long side surfaces, a centered mounting opening in said block extending perpendicular to and through said top and bottom surfaces, each of said long side surfaces having therein a threaded bore extending perpendicular thereto and intersecting said centered mounting opening perpendicular to its axis, a pair of intersecting tool recesses in each said long side surface being oppositely and equally inclined from said upper surface toward said lower surface and each said recess intersecting an adjacent one of said intermediate walls, a cutting bit within at least one of said recesses and extending through a said intermediate wall and a clamping means extending through said upper surface and clampingly engaging said cutting bit.

2. The combination of claim 1 further including a stabilizing hook attached to said side surface containing said bit by means including one of said threaded bores.

3. The combination of claim 1 further including an indicator means attached to one of said long side surfaces by means including one of said threaded bores.

4. The combination of claim 1 further including a plurality of said bits within a plurality of said recesses and extending through a plurality of said intermediate walls.

* * * * *